(12) United States Patent
Romano et al.

(10) Patent No.: US 10,985,975 B2
(45) Date of Patent: *Apr. 20, 2021

(54) CONSERVING COMPUTING RESOURCES DURING NETWORK PARALLEL PROCESSING

(71) Applicant: Bank of America Corporation, Charlotte, NC (US)

(72) Inventors: Brad E. Romano, Furlong, PA (US); Shashi Thanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,961

(22) Filed: Apr. 27, 2020

(65) Prior Publication Data
US 2020/0259706 A1    Aug. 13, 2020

Related U.S. Application Data

(63) Continuation of application No. 16/174,614, filed on Oct. 30, 2018, now Pat. No. 10,666,510.

(51) Int. Cl.
*H04L 29/08* (2006.01)
*H04L 12/24* (2006.01)

(52) U.S. Cl.
CPC .......... *H04L 41/0803* (2013.01); *H04L 67/10* (2013.01)

(58) Field of Classification Search
CPC ............. H04L 41/0803; H04L 41/0806; H04L 41/0896; H04L 67/10; H04L 63/10

USPC ........................................................ 709/201
See application file for complete search history.

(56) References Cited

U.S. PATENT DOCUMENTS

| | | | |
|---|---|---|---|
| 6,694,345 B1 * | 2/2004 | Brelsford | G06F 9/485 718/100 |
| 8,260,840 B1 | 9/2012 | Sirota et al. | |
| 8,706,798 B1 | 8/2014 | Suchter et al. | |
| 9,183,016 B2 * | 11/2015 | Zhou | G06F 9/45558 |
| 9,762,672 B2 | 9/2017 | Bonagiri et al. | |
| 9,787,761 B2 | 10/2017 | Bonagiri et al. | |
| 10,296,380 B1 * | 5/2019 | Garcia | G06F 9/4843 |
| 10,338,966 B2 * | 7/2019 | Chen | G06F 9/45558 |
| 2015/0150004 A1 * | 5/2015 | McGeer | G06F 9/5066 718/1 |

(Continued)

*Primary Examiner* — Ruolei Zong
(74) *Attorney, Agent, or Firm* — Michael A. Springs

(57) ABSTRACT

A parallel processing device includes a parallel processing engine implemented by a processor. The parallel processing engine is configured to execute a shell script for each particular processing job in a queue of processing jobs to run. The shell script is configured to dynamically generate a configuration file for each particular processing job. The configuration file instructs a network of computing systems to run the particular processing job using a particular number of parallel partitions corresponding to a parallel partitions parameter associated with the particular job. The configuration file includes randomized scratch directories for computing nodes within the network of computing systems and a calculated container size for the particular processing job. Each processing job is run on the network of computing systems according to the dynamically-generated configuration file of the particular processing job.

20 Claims, 4 Drawing Sheets

(56) References Cited

U.S. PATENT DOCUMENTS

| | | | |
|---|---|---|---|
| 2016/0130327 A1 | 5/2016 | Fu et al. | |
| 2017/0235608 A1* | 8/2017 | Zhuang | G06F 11/3006 |
| | | | 718/104 |
| 2017/0344395 A1* | 11/2017 | Abe | G06F 9/4881 |
| 2019/0130327 A1* | 5/2019 | Carpenter | G06F 9/45558 |
| 2019/0171483 A1* | 6/2019 | Santhar | G06N 20/00 |
| 2019/0354398 A1* | 11/2019 | Aggarwal | G06F 16/183 |

* cited by examiner

CONSERVING COMPUTING RESOURCES DURING NETWORK PARALLEL PROCESSING

CROSS-REFERENCE TO RELATED APPLICATIONS

This application is a continuation of U.S. patent application Ser. No. 16/174,614 filed Oct. 30, 2018, by Brad E. Romano et al., and entitled "CONSERVING COMPUTING RESOURCES DURING NETWORK PARALLEL PROCESSING," which is incorporated herein by reference.

TECHNICAL FIELD

The present disclosure relates generally to networks, and more specifically to conserving computing resources during network parallel processing.

BACKGROUND

One of the technical challenges associated with networking computing is load balancing during parallel processing. Existing systems for load balancing typically have a one-size-fit-all approach to assigning resources during parallel processing. For example, existing approaches typically have static configuration files that assign resources for all parallel computing jobs irrespective of the actual sizes of the jobs. This approach is overly restrictive and is not ideal for businesses that have many smaller parallel jobs to run on the computing network. This poses a technical challenge for computer systems because computing resources may get tied up and therefore not be available for use when needed by other jobs.

SUMMARY

In some embodiments, a parallel processing device includes one or more memory devices and a parallel processing engine. The one or more memory devices are operable to store a queue of processing jobs to run. The parallel processing engine is implemented by a processor communicatively coupled to the one or more memory devices. The parallel processing engine is configured to access the queue of processing jobs and execute a shell script for each particular processing job in the queue of processing jobs to run. The shell script is configured to access a queue size parameter associated with the particular processing job, calculate a container size for the particular processing job based on the queue size parameter, access a parallel partitions parameter associated with the particular processing job, and access a configuration variable associated with the particular processing job. The shell script is further configured to determine whether the configuration variable associated with the particular processing job matches a predetermined value. In response to determining that the configuration variable associated with the particular processing job matches the predetermined value, the shell script dynamically generates a configuration file for the particular processing job. The configuration file is configured to instruct a network of computing systems to run the particular processing job using a particular number of parallel partitions corresponding to the parallel partitions parameter. The configuration file includes randomized scratch directories for each computing node and the calculated container size for the particular processing job. The parallel processing engine is configured to trigger the particular processing job to run on the network of computing systems according to the dynamically-generated configuration file of the particular processing job.

The systems and methods disclosed herein provide several technical advantages. As one example, certain embodiments provide a parallel processing engine (e.g., an extract, transform, load (ETL) tool such as a BigIntegrate platform by IBM) which includes the ability to customize the levels of parallelism (e.g., the number of parallel executions for the job) and the container size for each particular job in a queue of jobs. This permits the available computing resources (e.g., computer processing power and computer memory) to be more efficiently used. Existing systems typically provide a static level of parallelism and container size for all jobs. This, in turn, causes computing resources to get tied up and go unused, especially for job queues that include many smaller jobs. In contrast, the disclosed system is configured to dynamically generate a configuration file for each job in a queue of jobs. The configuration file, which is used to run the job on a network of computing systems, includes the level of parallelism (e.g., the number of parallel partitions) and the container size for each particular job. Furthermore, the dynamically-generated configuration file may also include randomized scratch directories for each computing node. This may provide additional technical advantages by balancing out the input/output (IO) between those directories.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The systems and methods disclosed herein provide several technical advantages. As one example, certain embodiments provide a parallel processing engine (e.g., an extract, transform, load (ETL) tool such as a BigIntegrate platform by IBM) that includes the ability to customize the levels of parallelism (e.g., the number of parallel partitions) and the container size for each particular job in a queue of jobs. This permits the available computing resources (e.g., computer processing power and computer memory) to be more efficiently used. Existing systems typically provide a static level of parallelism and container size for all jobs. This, in turn, causes computing resources to get tied up and go unused, especially for job queues that include many smaller jobs. In contrast, the disclosed system is configured to dynamically generate a configuration file for each job in the queue of jobs based on inputs for each particular job (e.g., variable level of parallelism and container size). The configuration file, which is used to run the job on a network of computing systems, includes the level of parallelism (e.g., the number of parallel partitions) and the container size for particular job. Furthermore, the dynamically-generated configuration file may also include randomized scratch directories for each computing node. This may provide additional technical advantages by balancing out the input/output (IO) between those directories.

Figure 1:
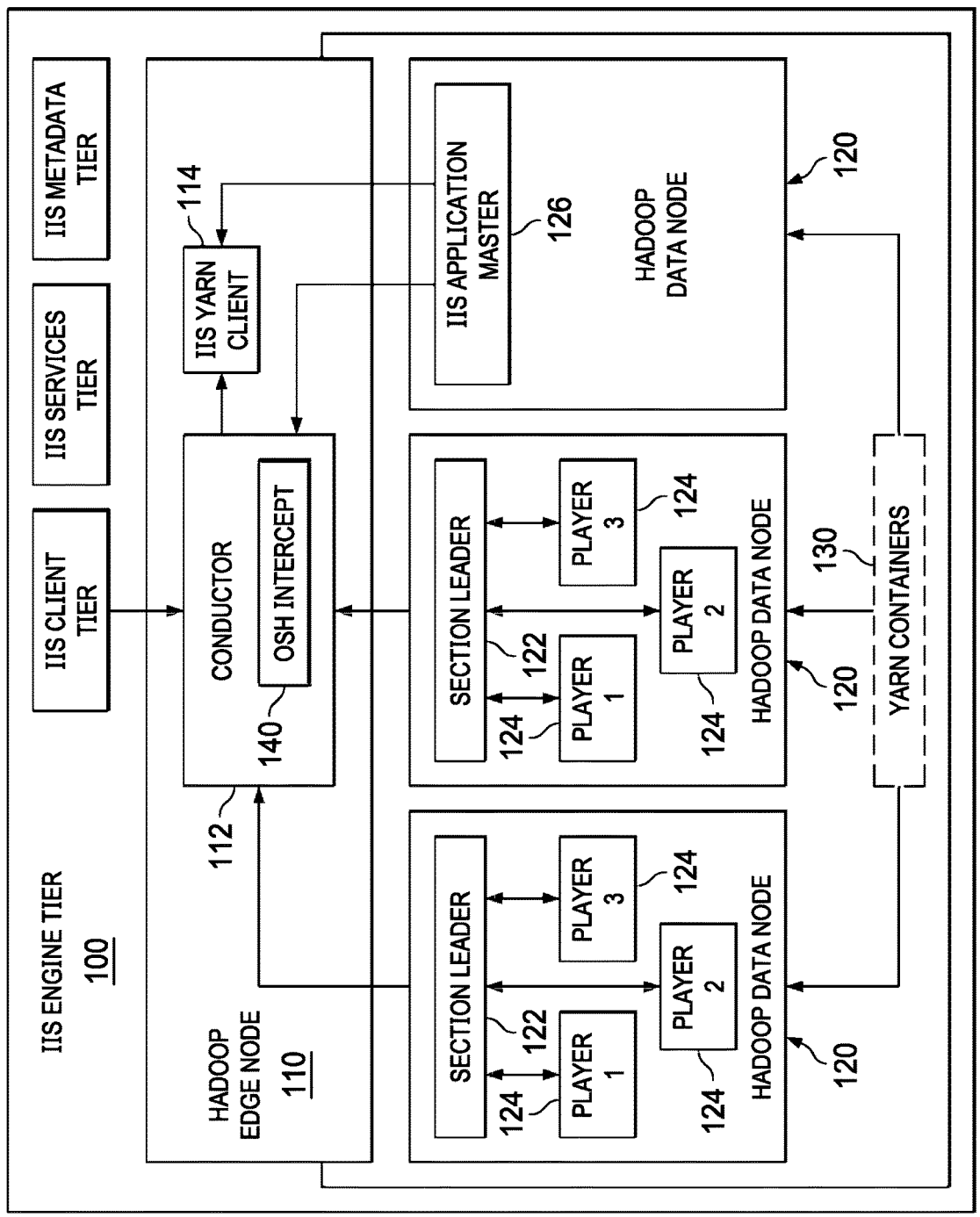
FIG. 1 is a schematic diagram of an embodiment of a parallel processing system using a Hadoop cluster.

FIG. 1 is a schematic diagram of an embodiment of a parallel processing system 100 that conserves computing resources during network parallel processing. Parallel processing system 100 includes multiple network devices (e.g. Hadoop edge node 110 and Hadoop data nodes 120) that are in signal communication with each other in a network. Each network device is configured to exchange data with other network devices in parallel processing system 100.

Examples of network devices 110 and 120 include, but are not limited to, computers, Internet-of-things (IoT) devices, mobile devices (e.g. smart phones or tablets), web clients, web servers, routers, modems, bridges, printers, or any other suitable type of network device. The network utilized by parallel processing system 100 is any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art upon viewing this disclosure.

In general, parallel processing system 100 may include any appropriate ETL process or tool (e.g., BigIntegrate platform by IBM) in combination with a Hadoop cluster. In the illustrated embodiment of FIG. 1, parallel processing system 100 includes a conductor 112 running on Hadoop edge node 110 and multiple section leaders 122 on Hadoop data nodes 120. In general, conductor 112 allows processing jobs to be run in both partition parallel (i.e., how many parallel partitions on one or more Hadoop data nodes 120 on which to run the job) and pipeline parallel (i.e., how many operations to run the job). Conductor 112 essentially breaks up an input data file into discrete (e.g., ten) physical pieces and then runs each one of those pieces against a copy of the job's program logic. Each one of those pieces are managed by a single section leader 122. Underneath each section leader 122 are multiple players 124. Each player 124 corresponds to an operator in the job. For example, one player 124 may handle read operations, one player 124 may handle transformation operations, one player 124 may handle sorting operations, one player 124 may handle aggregation operations, and one player 124 may handle write operations. Players 124 may all begin at the same time for efficiency (i.e., pipeline parallel processing).

Parallel processing system 100 may include one or more YARN ('yet another resource manager') clients 114 and YARN containers 130. YARN client 114 is a client that submits an application to run on a YARN cluster. YARN containers 130 are logical sets of resources (e.g., computer processing cores and memory) to run jobs within a cluster.

Typically, systems such as parallel processing system 100 use a static configuration file for every job that is run. This fixes the degree of parallel processing to be the same for all jobs. For example, typical systems may run all jobs ten ways parallel (e.g., each job is run on ten parallel partitions). Furthermore, typical systems also have a fixed container size (e.g., fixed amount of resources for YARN containers 130) for all jobs regardless of the size of the job. Since each YARN container 130 is essentially the amount of computer resources set aside for each process, fixing the amount of YARN containers 130 regardless of job size may result in under-utilized resources, especially on smaller jobs.

To address these and other problems with existing systems that use static configurations for parallel job processing, parallel processing system 100 utilizes an OSH intercept script 140 to dynamically generate a configuration file for each job in the queue of jobs. The configuration file, which is used to run the job on a network of computing systems such as a Hadoop cluster, includes the level of parallelism (e.g., the number of parallel partitions running on one or more Hadoop data nodes 120) and the container size (e.g., the amount of processing cores and memory assigned to each YARN container 130) for each particular job. By including the ability to customize the levels of parallelism (e.g., the number of parallel partitions) and the container size for each particular job in a queue of jobs, parallel processing system 100 permits the available computing resources (e.g., computer processing power and computer memory) to be more efficiently utilized. Furthermore, the dynamically-generated configuration file may also include randomized scratch directories for each computing node. This may provide additional technical advantages by balancing out the input/output (IO) between those directories. An example of using OSH intercept script 140 is discussed further below in reference to FIG. 2.

Figure 2:
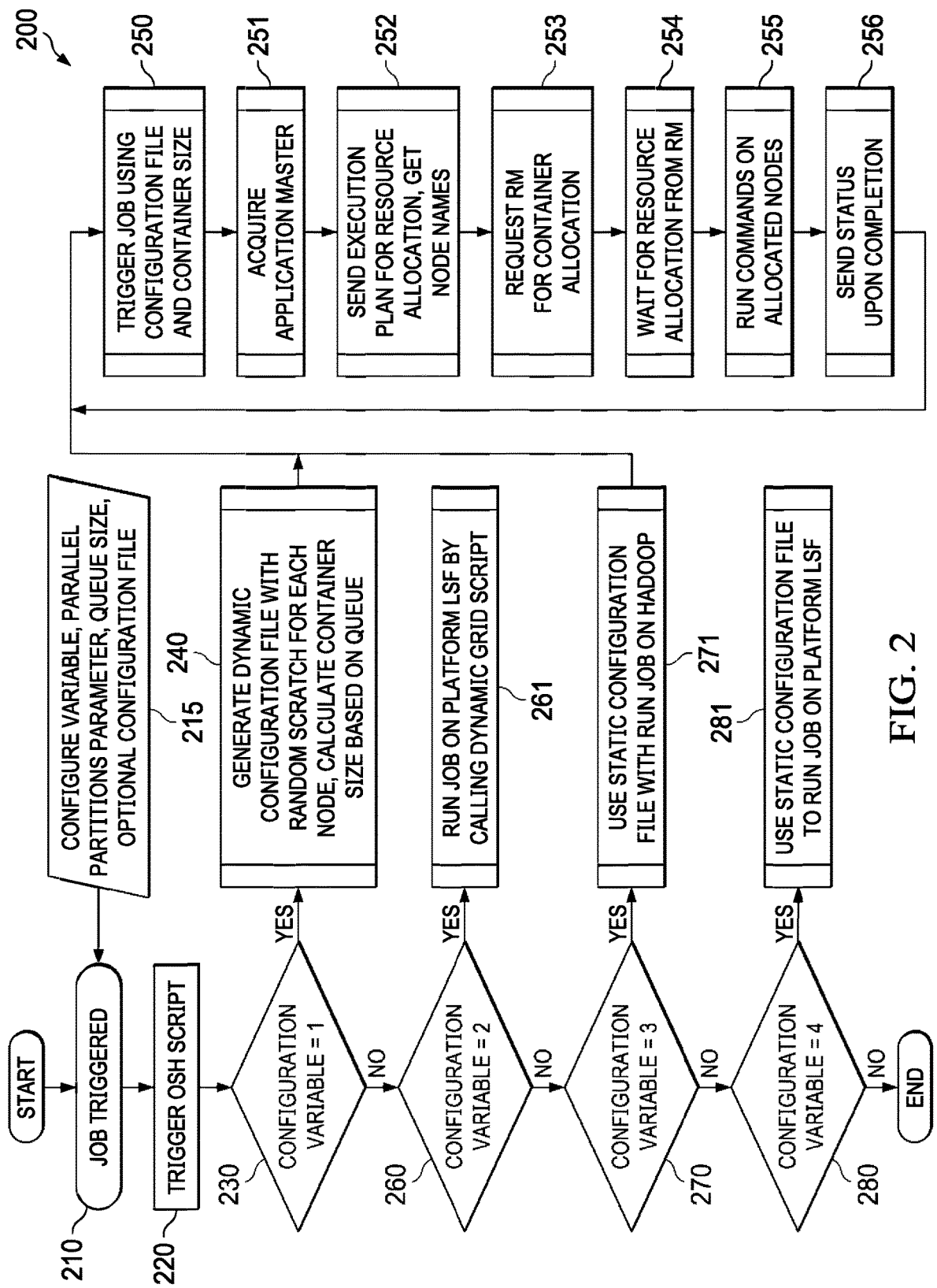
FIG. 2 is a flowchart of an embodiment of a parallel processing method that may be implemented by the system of FIG. 1.

FIG. 2 is a flowchart of an embodiment of a parallel processing method 200 that may be implemented by parallel processing system 100. At step 210, a processing job is triggered. In some embodiments, the processing job that is triggered is from a queue of processing jobs. In some embodiments, the processing job is triggered by conductor 112 of parallel processing system 100.

At step 215, various parameters are provided for the triggered processing job of step 210. In some embodiments, the parameters are stored in computer memory and are accessed by parallel processing system 100. In some embodiments, the parameters include a queue size parameter associated with the particular processing job, a parallel partitions parameter associated with the particular processing job, and a configuration variable associated with the particular processing job. The parallel partitions parameter may indicate the number of parallel partitions (e.g., 12 as indicated in the example below) that should be used to run the job (i.e., partition parallel). The configuration variable is a variable that triggers parallel processing system 100 to dynamically generate a configuration file for the processing job.

The queue size parameter of step 215 may, in some embodiments, be a particular size category chosen from a plurality of size categories. For example, the size categories may be "small," "medium," and "large." Each processing job may then be labeled via its queue size parameter to be either "small," "medium," or "large." Parallel processing system 100 may, in some embodiments, use the queue size parameter to calculate the container size (i.e., amount of computer cores and memory assigned to YARN containers 130) for the particular processing job. For example, some embodiments may have a preassigned container size for each particular size category. As a specific example, "small" may correspond to a first amount of computer cores and memory assigned to YARN containers 130, "medium" may correspond to second amount of computer cores and memory assigned to YARN containers 130 that is greater than "small,", and "large" may correspond to a third amount of computer cores and memory assigned to YARN containers 130 that is greater than "medium." While specific size categories have been listed for illustrative purposes, any appropriate number and type of size categories may be used.

At step 220, parallel processing method 200 triggers a shell script for the particular processing job of step 210. In some embodiments, the shell script is an Orchestrate Shell (OSH) script.

At step 230, parallel processing method 200 determines whether the configuration variable associated with the particular processing job (i.e., step 215) matches a predetermined value. If the configuration variable matches a certain value (e.g., "1"), parallel processing method 200 proceeds to step 240. Otherwise, parallel processing method 200 proceeds to step 260.

At step 240, parallel processing method 200 dynamically generates a configuration file for the particular processing job of step 210. The dynamically-generated configuration file instructs parallel processing system 100 how to run the particular processing job of 210 and includes how many parallel partitions on one or more Hadoop data nodes 120 should be used for the job based on the parallel partitions parameter of step 215. The configuration file also includes a calculated container size (e.g., amount of resources assigned to YARN containers 130) that is based on the queue size parameter of step 215. In general, this step (along with steps 215 and 220) provide many advantages over existing systems. Typically, existing systems utilize a static configuration file across all processing jobs. This, in turn, only permits a static level of parallelism and container size for all jobs. This causes computing resources to get tied up and go unused, especially for job queues that include many smaller jobs. In contrast, parallel processing method 200 dynamically generates a configuration file for each job in the queue of jobs based on the inputs of step 215 for each particular job (e.g., variable level of parallelism and container size). The dynamically-generated configuration file, which is used to run the job on a network of computing systems, includes the level of parallelism (e.g., the number of parallel partitions) and the container size for particular job. Furthermore, the dynamically-generated configuration file may also include randomized scratch directories for each computing node. This may provide additional technical advantages by balancing out the input/output (IO) between those directories.

At step 250, parallel processing method 200 triggers the processing job using the dynamically-generated configuration file of step 240. After step 240, parallel processing method 200 may execute steps 251-256 as illustrated in FIG. 2.

At steps 260, 270, and 280, parallel processing method 200 performs steps that typical systems may execute (i.e., steps that do not include dynamically generating a configuration file for the processing job). If the configuration variable associated with the particular processing job (i.e., step 215) matches a certain predetermined value at step 260 (i.e., "2"), parallel processing method 200 proceeds to step 261 where the job is run by calling a dynamic grid script. If the configuration variable associated with the particular processing job (i.e., step 215) matches a certain predetermined value at step 270 (i.e., "3"), parallel processing method 200 proceeds to step 271 where a static configuration file is used to run the job on the Hadoop cluster. If the configuration variable associated with the particular processing job (i.e., step 215) matches a certain predetermined value at step 280 (i.e., "4"), parallel processing method 200 proceeds to step 281 where a static configuration file is used to run the job on a platform load-sharing facility. If the configuration variable associated with the particular processing job (i.e., step 215) does not match any predetermined values, parallel processing method 200 ends.

Figure 3:
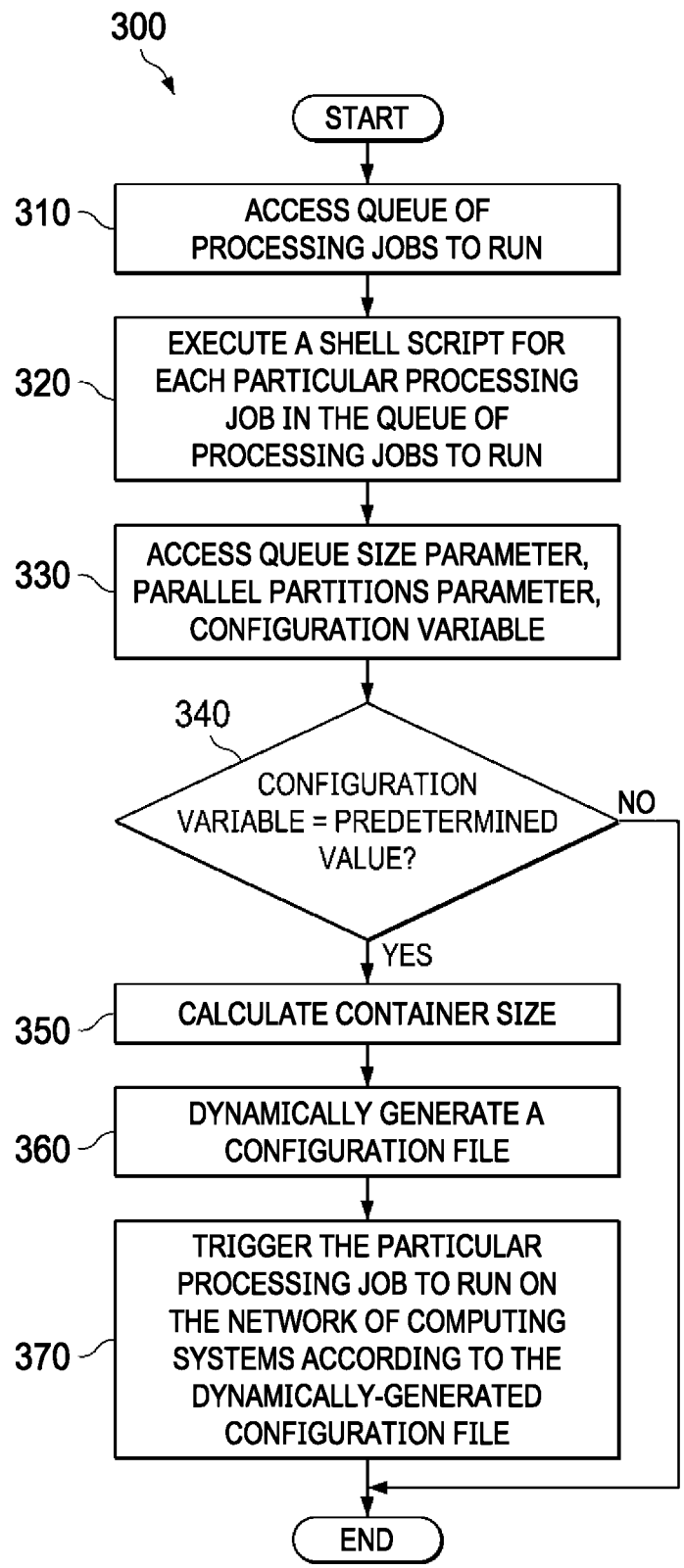
FIG. 3 is a flowchart of an embodiment of another parallel processing method that may be implemented by the system of FIG. 1.

FIG. 3 is a flowchart of an embodiment of another parallel processing method 300 that may be implemented by parallel processing system 100. Parallel processing method 300 is similar to parallel processing method 200, but provides additional details not discussed above. At step 310, parallel processing method 300 accesses a queue of processing jobs to run. In some embodiments, the queue of processing jobs to run is stored in one more memory devices.

At step 320, parallel processing method 300 executes a shell script for each particular processing job in the queue of processing jobs to run. In some embodiments, the shell script of step 320 is an OSH script. At step 330, parallel processing method 300 accesses a queue size parameter associated with the particular processing job, a parallel partitions parameter associated with the particular processing job, and a configuration variable associated with the particular processing job. Each of these parameters are discussed in more detail above in reference to FIG. 2.

At step 340, parallel processing method 300 determines whether the configuration variable associated with each particular processing job matches a predetermined value. If the configuration variable matches the predetermined value, parallel processing method 300 proceeds to step 350. Otherwise, parallel processing method 300 may end or proceed to alternate processing steps.

At step 350, parallel processing method 300 calculates a container size for the particular processing job based on the queue size parameter. As discussed above, each processing job may be labeled via its queue size parameter to be either "small," "medium," or "large" (or any other appropriate label). At step 350, parallel processing method 300 may use the queue size parameter to calculate the container size (i.e., the amount of computer cores and memory assigned to YARN containers 130) for the particular processing job. For example, parallel processing method 300 may determine a preassigned container size for the particular size category, as discussed above.

At step 360, parallel processing method 300 dynamically generates a configuration file for the particular processing job. In general, the configuration file is configured to instruct a network of computing systems (e.g., a Hadoop cluster) to run the particular processing job using a particular number of parallel partitions corresponding to the parallel partitions parameter of step 330. In some embodiments the configuration file includes randomized scratch directories for each computing node and the calculated container size for the particular processing job of step 350. An example of randomized scratch directories is provided below.

At step 370, parallel processing method 300 triggers each particular processing job to run on the network of computing systems according to its associated dynamically-generated configuration file of step 360. In general, the number of parallel partitions for each processing job in the queue of processing jobs processed by parallel processing method 300 may be different such that the number of parallel partitions is customizable across the queue of processing jobs. Furthermore, the container size for each processing job in the queue of processing jobs may be different such that the container size is customizable across the queue of processing jobs. This provides the ability to customize the levels of parallelism (e.g., the number of parallel partitions) and the container size for each particular job in a queue of jobs. As a result, available computing resources (e.g., computer processing cores and computer memory within YARN containers 130) may be more efficiently used.

Figure 4:
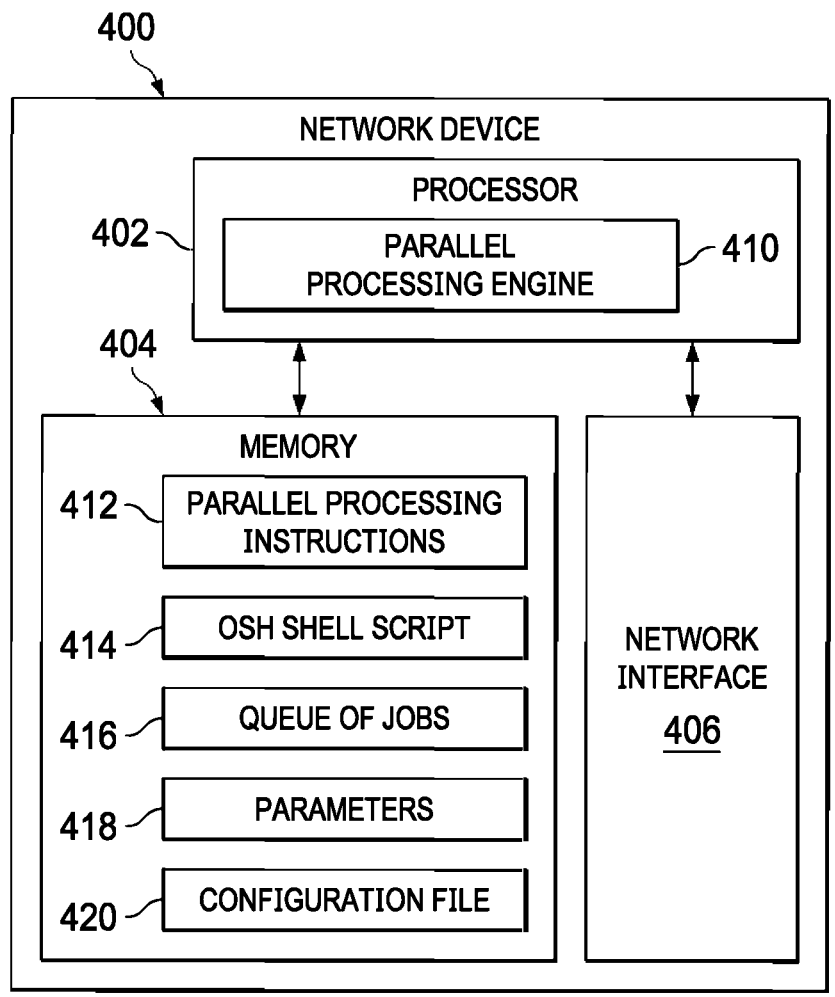
FIG. 4 is a schematic diagram of an embodiment of a network device configured to implement a parallel processing engine according to the present disclosure.

FIG. 4 is a schematic diagram of an embodiment of a network device 400 configured to implement parallel processing according to the present disclosure. The network device 400 comprises a processor 402, one or more memory devices 404, and a network interface 406. The network interface 400 may be configured as shown or in any other suitable configuration.

In some embodiments, the processor 402 comprises one or more processors operably coupled to one or more memory devices 4C4. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the one or more memory devices 404. The one or more processors 402 are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 402 are configured to implement various instructions. For example, the one or more processors are configured to execute instructions to implement a parallel processing engine 410. In this way, processor 402 may be a special purpose computer designed to implement function disclosed herein. In an embodiment, parallel processing engine 410 is implemented using logic units, FPGAs, ASICs, DSPs, or any other suitable hardware. The parallel processing engine 410 is configured similar to the parallel processing engine described above. An example of the parallel processing engine 410 in operation is described in FIGS. 2 and 3.

The one or more memory devices 404 may include one or more disks, tape drives, or solid-state drives, and may be used as an over-flow data storage device, to store programs when such programs are selected for execution, and to store instructions and data that are read during program execution. The one or more memory devices 404 may be volatile or non-volatile and may comprise read-only memory (ROM), random-access memory (RAM), ternary content-addressable memory (TCAM), dynamic random-access memory (DRAM), and static random-access memory (SRAM). The one or more memory devices 404 are operable to store parallel processing instructions 412, OSH shell script 414, queue of jobs 416, parameters 418, configuration file 420, and/or any other data or instructions. The parallel processing instructions 412 may comprise any suitable set of instructions, logic, rules, or code operable to execute the parallel processing engine 410 and/or methods 200 and 300 discussed above.

OSH shell script 414 in general is any suitable set of instructions, logic, rules, or code operable to execute when triggered by parallel processing engine 410 to dynamically generate configuration file 420 as discussed above. Queue of jobs 416 is any appropriate computer file or stored data that lists processing jobs that are to be run. Parameters 418 are individual parameters for each processing job within queue of jobs 416. Parameters 418 may include a queue size parameter associated with each particular processing job, a parallel partitions parameter associated with each particular processing job, and a configuration variable associated with each particular processing job. Configuration file 420 is a dynamically-generated configure file that is used to instruct a network of computing systems (e.g., a Hadoop cluster) to run the particular processing job. In some embodiments, configuration file 420 includes a particular number of parallel partitions corresponding to the parallel partitions parameter, randomized scratch directories for each computing node, and a calculated container size for the particular processing job.

The network interface 406 is configured to enable wired and/or wireless communications. The network interface 406 is configured to communicate data between network devices in parallel processing system 100 and/or any other system or domain. For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

Below are examples of configuration files to better illustrate the disclosed embodiments. First, a typical static configuration file is shown below:

```
{
node "node1"
{
    fastname "name.company.com"
    pools "conductor"
    resource disk "/iis_sit_dataset4" {pools ""}
    resource disk "/iis_sit_dataset5" {pools ""}
    resource disk "/iis_sit_dataset6" {pools ""}
    resource disk "/iis_sit_dataset7" {pools ""}
    resource disk "/iis_sit_dataset8" {pools ""}
    resource disk "/iis_sit_dataset1" {pools ""}
    resource disk "/iis_sit_dataset2" {pools ""}
    resource disk "/iis_sit_dataset3" {pools ""}
    resource scratchdisk "/iis_scratch01" {pools ""}
    resource scratchdisk "/iis_scratch02" {pools ""}
    resource scratchdisk "/iis_scratch03" {pools ""}
    resource scratchdisk "/iis_scratch04" {pools ""}
}
node "node2"
}
    fastname "$host"
    pools ""
        resource disk "/iis_sit_dataset4" {pools ""}
        resource disk "/iis_sit_dataset5" {pools ""}
        resource disk "/iis_sit_dataset6" {pools ""}
        resource disk "/iis_sit_dataset7" {pools ""}
        resource disk "/iis_sit_dataset8" {pools ""}
        resource disk "/iis_sit_dataset1" {pools ""}
        resource disk "/iis_sit_dataset2" {pools ""}
        resource disk "/iis_sit_dataset3" {pools ""}
        resource scratchdisk "/iis_scratch01" {pools ""}
        resource scratchdisk "/iis_scratch02" {pools ""}
        resource scratchdisk "/iis_scratch03" {pools ""}
        resource scratchdisk "/iis_scratch04" {pools ""}
    instances 12
}
}
```

In this example, all processing jobs will use the same number of parallel partitions (i.e., 12) and the same number of resources. Typical systems utilize static configuration files such as these to provide a static level of parallelism and container size for all jobs. This, in turn, causes computing resources to get tied up and go unused, especially for job queues that include many smaller jobs. Embodiments of the disclosure, however, dynamically generate a configuration file for each job in a queue of jobs. An example of a dynamically-generated configuration file is provided below:

```
$APT_GRID_COMPUTENODES = 12,2 (i.e., parallel partitions
parameter)
$APT_GRID_PARTITIONS = 1 (i.e., configuration variable)
$APT_GRID_ENABLE 4 = YES
$APT_GRID_QUEUE=SIT_medium (i.e., queue size parameter)
<osh> INFO: APT_YARN_CONTAINER_SIZE : 512 (i.e., container
size parameter)
{
node "conductor"
{
    fastname "name.company.com"
    pools "conductor"
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch01/" {pools ""}
    resource scratchdisk "/iis_scratch02/" {pools ""}
    resource scratchdisk "/iis_scratch03/" {pools ""}
    resource scratchdisk "/iis_scratch04/" {pools ""}
}
node "node1"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch04/" {pools ""}
    resource scratchdisk "/iis_scratch03/" {pools ""}
    resource scratchdisk "/iis_scratch01/" {pools ""}
    resource scratchdisk "/iis_scratch02/" {pools ""}
}
node "node2"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch04/" {pools ""}
    resource scratchdisk "/iis_scratch03/" {pools ""}
    resource scratchdisk "/iis_scratch01/" {pools ""}
    resource scratchdisk "/iis_scratch02/" {pools ""}
}
node "node3"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch04/" {pools ""}
    resource scratchdisk "/iis_scratch03/" {pools ""}
    resource scratchdisk "/iis_scratch01/" {pools ""}
    resource scratchdisk "/iis_scratch02/" {pools ""}
}
node "node4"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch03/" {pools ""}
    resource scratchdisk "/iis_scratch04/" {pools ""}
    resource scratchdisk "/iis_scratch02/" {pools ""}
    resource scratchdisk "/iis_scratch01/" {pools ""}
}
node "node5"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch03/" {pools ""}
    resource scratchdisk "/iis_scratch04/" {pools ""}
    resource scratchdisk "/iis_scratch02/" {pools ""}
    resource scratchdisk "/iis_scratch01/" {pools ""}
}
node "node6"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch01/" {pools ""}
    resource scratchdisk "/iis_scratch02/" {pools ""}
    resource scratchdisk "/iis_scratch03/" {pools ""}
    resource scratchdisk "/iis_scratch04/" {pools ""}
}
node "node7"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch01/" {pools ""}
    resource scratchdisk "/iis_scratch02/" {pools ""}
    resource scratchdisk "/iis_scratch03/" {pools ""}
    resource scratchdisk "/iis_scratch04/" {pools ""}
}
node "node8"
{
```

-continued

```
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch02/" {pools ""}
    resource scratchdisk "/iis_scratch01/" {pools ""}
    resource scratchdisk "/iis_scratch04/" {pools ""}
    resource scratchdisk "/iis_scratch03/" {pools ""}
}
node "node9"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch04/" {pools ""}
    resource scratchdisk "/iis_scratch03/" {pools ""}
    resource scratchdisk "/iis_scratch01/" {pools ""}
    resource scratchdisk "/iis_scratch02/" {pools ""}
}
node "node10"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch02/" {pools ""}
    resource scratchdisk "/iis_scratch01/" {pools ""}
    resource scratchdisk "/iis_scratch04/" {pools ""}
    resource scratchdisk "/iis_scratch03/" {pools ""}
}
node "node11"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch02/" {pools ""}
    resource scratchdisk "/iis_scratch01/" {pools ""}
    resource scratchdisk "/iis_scratch04/" {pools ""}
    resource scratchdisk "/iis_scratch03/" {pools ""}
}
node "node12"
{
fastname "$host"
pools ""
    resource disk "/iis_sit_dataset1/" {pools ""}
    resource disk "/iis_sit_dataset2/" {pools ""}
    resource disk "/iis_sit_dataset3/" {pools ""}
    resource disk "/iis_sit_dataset4/" {pools ""}
    resource disk "/iis_sit_dataset5/" {pools ""}
    resource disk "/iis_sit_dataset6/" {pools ""}
    resource disk "/iis_sit_dataset7/" {pools ""}
    resource disk "/iis_sit_dataset8/" {pools ""}
    resource scratchdisk "/iis_scratch04/" {pools ""}
    resource scratchdisk "/iis_scratch03/" {pools ""}
    resource scratchdisk "/iis_scratch01/" {pools ""}
    resource scratchdisk "/iis_scratch02/" {pools ""}
}
}
```

The dynamically-generated configuration file, which is then used to run the job on a network of computing systems such as a Hadoop cluster, includes the level of parallelism (e.g., the number of parallel partitions which in this example is 12) and the container size for each particular job (which is this case is 512 and is calculated using the queue size parameter of "SIT_medium"). Furthermore, the dynamically-generated configuration file also include randomized scratch directories for each computing node as illustrated above. This may provide additional technical advantages by balancing out the input/output (IO) between those directories.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A parallel processing device, comprising:
   one or more memory devices operable to store a queue of processing jobs to run; and
   a parallel processing engine implemented by a processor communicatively coupled to the one or more memory devices, the parallel processing engine configured to:
   access the queue of processing jobs to run; and
   execute a shell script for each particular processing job in the queue of processing jobs to run, the shell script configured to:
   determine a queue size parameter associated with the particular processing job by calculating a container size for the particular processing job;
   determine a parallel partitions parameter associated with the particular processing job, wherein the parallel partition parameter indicates a number of parallel partitions to be used to run the particular processing job;

determine a configuration variable associated with the particular processing job, wherein the configuration variable is a predetermined value that indicates to use which configuration method to trigger a particular processing job;

if the configuration variable is a first value:
dynamically generate a first configuration file for the particular processing job, the first configuration file configured to instruct a network of computing systems to run the particular processing job using a particular number of parallel partitions corresponding to the parallel partitions parameter, the first configuration file comprising: randomized scratch directories for computing nodes within the network of computing systems; and the calculated container size for the particular processing job; and trigger the particular processing job to run on the network of computing systems according to the first configuration file of the particular processing job; and if the configuration variable is a second value, trigger the particular processing job to run on the network of computing systems by calling a dynamic grid script, wherein the dynamic gird script is configured to allocate available computing nodes to run the particular processing job.

2. The parallel processing device of claim 1, wherein if the configuration variable is a third value, the shell script is configured to:

generate a second configuration file for the particular processing job, the second configuration file configured to instruct the network of computing systems to run the particular processing job; and trigger the particular processing job to run on the network of computing systems according to the second configuration file of the particular processing job.

3. The parallel processing device of claim 1, wherein if the configuration variable is a fourth value, the shell script is configured to:

generate a third configuration file for the particular processing job, the third configuration file configured to instruct the network of computing systems to run the particular processing job using a platform load-sharing facility; and trigger the particular processing job to run on the network of computing systems according to the third configuration file of the particular processing job.

4. The parallel processing device of claim 1, wherein the parallel processing engine comprises an extract, transform, load (ETL) process.

5. The parallel processing device of claim 1, wherein the parallel processing engine comprises a computer platform.

6. The parallel processing device of claim 1, wherein:

the number of parallel partitions for each processing job in the queue of processing jobs may be different such that the number of parallel partitions is customizable across the queue of processing jobs; and the container size for each processing job in the queue of processing jobs may be different such that the container size is customizable across the queue of processing jobs.

7. The parallel processing device of claim 1, wherein:
the queue size parameter comprises a particular size category chosen from a plurality of size categories; and calculating the container size for the particular processing job based on the queue size parameter comprises determining a preassigned container size for the particular size category.

8. A parallel processing method, comprising:

accessing, by a parallel processing engine, a queue of processing jobs to run;

executing, by the parallel processing engine, a shell script for each particular processing job in the queue of processing jobs to run;

determining, by the shell script, a queue size parameter associated with a particular processing job by calculating a container size for the particular processing job;

determining, by the shell script, a parallel partitions parameter associated with the particular processing job, wherein the parallel partition parameter indicates a number of parallel partitions to be used to run the particular processing job;

determining, by the shell script, a configuration variable associated with the particular processing job, wherein the configuration variable is a predetermined value that indicates to use which configuration method to trigger a particular processing job;

if the configuration variable is a first value:
dynamically generating a first configuration file for the particular processing job, the first configuration file configured to instruct a network of computing systems to run the particular processing job using a particular number of parallel partitions corresponding to the parallel partitions parameter, the first configuration file comprising:

randomized scratch directories for computing nodes within the network of computing systems; and the calculated container size for the particular processing job; and triggering the particular processing job to run on the network of computing systems according to the first configuration file of the particular processing job; and if the configuration variable is a second value, triggering the particular processing job to run on the network of computing systems by calling a dynamic grid script, wherein the dynamic gird script is configured to allocate available computing nodes to run the particular processing job.

9. The parallel processing method of claim 8, further comprising if the configuration variable is a third value:

generating a second configuration file for the particular processing job, the second configuration file configured to instruct the network of computing systems to run the particular processing job; and triggering the particular processing job to run on the network of computing systems according to the second configuration file of the particular processing job.

10. The parallel processing method of claim 8, further comprising if the configuration variable is a fourth value:

generating a third configuration file for the particular processing job, the third configuration file configured to instruct the network of computing systems to run the particular processing job using a platform load-sharing facility; and triggering the particular processing job to run on the network of computing systems according to the third configuration file of the particular processing job.

11. The parallel processing method of claim 8, wherein the parallel processing engine comprises an extract, transform, load (ETL) process.

12. The parallel processing method of claim 8, wherein the parallel processing engine comprises a computer platform.

13. The parallel processing method of claim 8, wherein:
the number of parallel partitions for each processing job in the queue of processing jobs may be different such that the number of parallel partitions is customizable across the queue of processing jobs; and
the container size for each processing job in the queue of processing jobs may be different such that the container size is customizable across the queue of processing jobs.

14. The parallel processing method of claim 8, wherein:
the queue size parameter comprises a particular size category chosen from a plurality of size categories; and
calculating the container size for the particular processing job based on the queue size parameter comprises determining a preassigned container size for the particular size category.

15. A computer program product comprising executable instructions stored in a non-transitory computer readable medium such that when executed by a processor causes the processor to implement a parallel processing engine configured to:
access a queue of processing jobs to run; and
execute a shell script for each particular processing job in a queue of processing jobs to run, the shell script configured to:
determine a queue size parameter associated with the particular processing job by calculating a container size for the particular processing job;
determine a parallel partitions parameter associated with the particular processing job, wherein the parallel partition parameter indicates a number of parallel partitions to be used to run the particular processing job;
determine a configuration variable associated with the particular processing job, wherein the configuration variable is a predetermined value that indicates to use which configuration method to trigger a particular processing job;
if the configuration variable is a first value:
dynamically generate a first configuration file for the particular processing job, the first configuration file configured to instruct a network of computing systems to run the particular processing job using a particular number of parallel partitions corresponding to the parallel partitions parameter, the first configuration file comprising:
randomized scratch directories for computing nodes within the network of computing systems; and
the calculated container size for the particular processing job; and
trigger the particular processing job to run on the network of computing systems according to the first configuration file of the particular processing job; and
if the configuration variable is a second value, trigger the particular processing job to run on the network of computing systems by calling a dynamic grid script, wherein the dynamic gird script is configured to allocate available computing nodes to run the particular processing job.

16. The computer program product of claim 15, wherein if the configuration variable is a third value, the shell script is further configured to:
generate second a configuration file for the particular processing job, the second configuration file configured to instruct the network of computing systems to run the particular processing job; and
trigger the particular processing job to run on the network of computing systems according to the second configuration file of the particular processing job.

17. The computer program product of claim 15, wherein if the configuration variable is a fourth value, the shell script is further configured to:
generate a third configuration file for the particular processing job, the third configuration file configured to instruct the network of computing systems to run the particular processing job using a platform load-sharing facility; and
trigger the particular processing job to run on the network of computing systems according to the third configuration file of the particular processing job.

18. The computer program product of claim 15, wherein the parallel processing engine comprises an extract, transform, load (ETL) process.

19. The computer program product of claim 15, wherein:
the number of parallel partitions for each processing job in the queue of processing jobs may be different such that the number of parallel partitions is customizable across the queue of processing jobs; and
the container size for each processing job in the queue of processing jobs may be different such that the container size is customizable across the queue of processing jobs.

20. The computer program product of claim 15, wherein:
the queue size parameter comprises a particular size category chosen from a plurality of size categories; and
calculating the container size for the particular processing job based on the queue size parameter comprises determining a preassigned container size for the particular size category.

* * * * *